Jan. 27, 1970     L. L. MIELKE     3,491,630
BOLT, NUT AND WASHER COMBINATION
Filed July 8, 1968
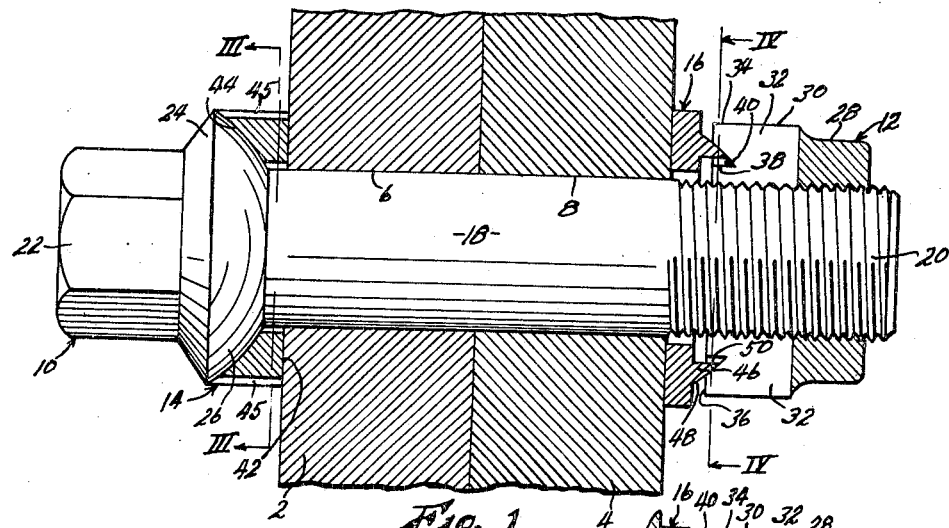
Fig. 1
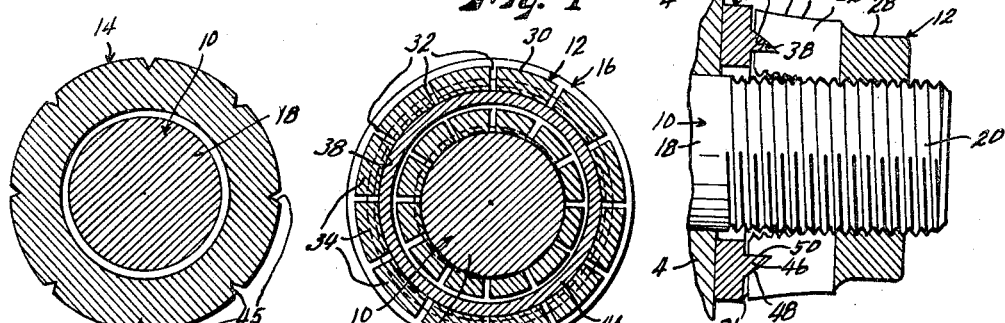
Fig. 3    Fig. 4    Fig. 2
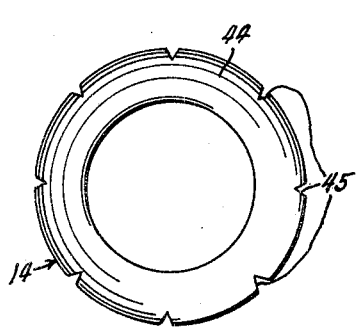 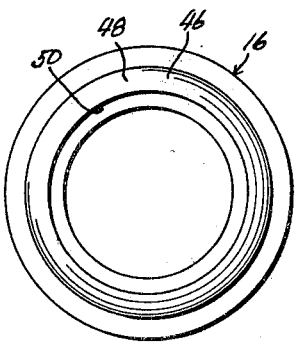 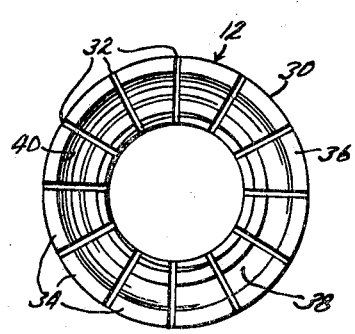
Fig. 5    Fig. 6    Fig. 7
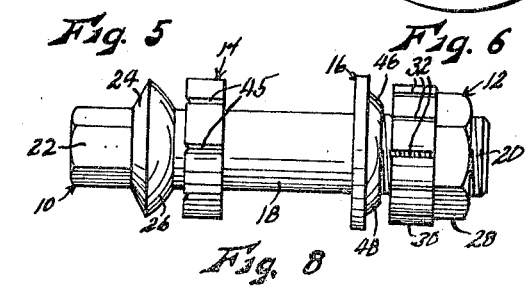
Fig. 8
INVENTOR.
Lloyd L. Mielke
BY John A. Hamilton
Attorney.

United States Patent Office 3,491,630
Patented Jan. 27, 1970

3,491,630
BOLT, NUT AND WASHER COMBINATION
Lloyd L. Mielke, 4125 Hawthorne Circle,
Kansas City, Mo. 64133
Filed July 8, 1968, Ser. No. 743,079
Int. Cl. F16b 43/00, 27/00, 29/00
U.S. Cl. 85—1     4 Claims

ABSTRACT OF THE DISCLOSURE

A combination of a bolt, nut and two washers, one washer disposed beneath the bolt head and the other beneath the nut, the bolt head and head washer having cooperating ball-and-socket formations whereby the washer may swivel universally about the bolt axis, the nut and nut washer also having ball-and-socket formations cooperating in like manner, and also cooperating to expand a portion of the nut to relieve the threads thereof from the bolt threads, as said nut is drawn tight.

---

This invention relates to new and useful improvements in bolt-and-nut connectors, and has as its principal object the provision of a connector of this type having novel means eliminating several of the common causes of breakage and failure thereof.

As is well known in the art, bolt-and-nut connectors are subject to breakage and failure for several reasons, and in critical installations, such as in aircraft construction, such failure can have tragic results. For example, even a perfectly true and accurately formed nut and bolt connection is subject to stress concentrations at certain points, particularly at the juncture of the head and shank of the bolt, and in the root of the shank threads at the inner face of the nut. Also, lateral bending stresses are often applied to the bolt shank resulting from virtually unavoidable inaccuracies in the formation of the connector or its application. If the bolt hole in the members to be joined thereby, hereinafter called the work pieces, is not drilled precisely normally to the surfaces of said members to be abutted by the bolt head and nut, the head and nut will tend to be forced into said normal relation to the work pieces as the nut is tightened, thereby applying a bending stress to the shank. Even if the bolt hole is drilled accurately, the surface of the bolt head abutting the work pieces may not be precisely normal to the bolt axis, or the surface of the nut abutting the work pieces may not be precisely normal to the axis of the threaded nut aperture, so that bending stresses are still applied to the bolt shank as the nut is tightened. The inaccuracies referred to are ordinarily very slight, but often do result in premature failure of bolted connections, particularly in services in which they are subjected to continuous and often rather violent vibration, as in aircraft.

Accordingly, the principal object of the present invention is the provision of a bolt connection which largely eliminates all of the above enumerated causes of failure, in that it provides for accurate axial loading of the bolt shank in great degree, despite inaccuracies of manufacture of the connector or in drilling of the bolt hole, whereby to largely eliminate transverse bending stresses, and further provides for distribution of those residual bending stresses which may still occur over longer lengths of the bolt shank, rather than concentrating said stresses strongly in virtually a single transverse plane of the shank as occurs in usual nut and bolt connections.

My invention may be summarized as the combination of a bolt, nut and two washers, one of said washers being adapted to encircle the bolt shank beneath the bolt head, and the other being adapted to encircle the bolt shank beneath the nut, the bolt head and head washer having cooperating ball-and-socket formations centered on the bolt axis whereby the bolt may swivel universally in said washer, and the nut and nut washer also having ball-and-socket formations cooperating in like manner, the nut washer also functioning to expand a portion of the length of the nut at its inner end, whereby to relieve engagement between the nut and bolt threads in that portion of the nut.

Another object is the provision, in a connector of the character described, of means whereby one of said washers is weakened whereby it normally will be the first element of the connector to fail if failure does occur. The washer is clearly visible, whereby to give a clear indication that the connector should be replaced, but at the same time its failure does not represent complete failure of the connector, so that said connector can be relied on for at least partial holding power until it can be replaced This is a safety provision.

Other objects are simplicity and economy of construction, efficiency and dependability of operation, and adaptability for use in a wide variety of applications.

With these objects in view, as well as other objects which will appear in the course of the specification, reference will be had to the accompanying drawing, wherein:

FIG. 1 is a longitudinal sectional view, with parts left in elevation, of a bolt, nut and washer combination embodying the present invention, shown operatively applied to a pair of work pieces to be joined thereby, but before the nut is tightened, FIG. 2 is a fragmentary view similar to FIG. 1, but showing the nut tightened, FIG. 3 is a sectional view taken on line III—III of FIG. 1, FIG. 4 is a sectional view taken on line IV—IV of FIG. 1, FIG. 5 is an outer face view of the head washer, FIG. 6 is an outer face view of the nut washer, FIG. 7 is a face view of the inner end of the nut, and FIG. 8 is a side elevational view of an assembly of the bolt, nut and two washers of the combination.

Like reference numerals apply to similar parts throughout the several views, and the numerals 2 and 4 apply respectively to a pair of overlapping work pieces having matching holes 6 and 8 for receiving a bolt and nut connector to secure them together. The connector shown, and forming the subject matter of the present invention, comprises a bolt indicated generally by the numeral 10, a nut 12, a head washer 14, and a nut washer 16.

Bolt 10 has the usual cylindrical shank 18, threaded at one end as indicated at 20, and having a head 22 at its opposite end. Said head is formed to present flats for the reception of a wrench in the usual manner, and also includes a flange 24 immediately adjoining shank 18. The surface 26 of said flange confronting the shank is spherically curved so as to be convex toward the threaded end of the bolt, with its center of curvature lying in the bolt axis. Surface 26 merges with the shank at an obtuse angle, and the angle may further be rounded to a slight radius, for reasons to be discussed.

Nut 12 is generally tubular in form, being internally threaded. Its outer end portion 28 is provided externally with wrench flats in the same manner as bolt head 22, and its inner end portion 30 is radially slotted by thin radial slots 32, whereby said portion 30 is divided into a series of angularly spaced, longitudinally extending tongues 34. The inner end surface 36 of the nut, which of course is nominally at right angles to the nut axis, has an annular groove 38 formed therein, said groove being concentric with the nut axis and of larger diameter than the threaded central aperture of the nut. Said groove intersects each of the slots 32. The outer wall 40 of said groove is spherically curved so as to be concave toward end surface 36 of the nut, with its center of curvature lying in the nut axis. The inner wall of said groove may be cylindrical concentrically with the nut axis.

Head washer 14 is circular, having a central aperture somewhat larger than the bolt shank. The inner end surface 42 thereof is planar and normal to the washer axis, and its outer surface 44 is spherically curved to the same radius of curvature as the spherical surface 26 of the bolt head, with its center of curvature lying in the washer axis. Externally, the head washer has a series of longitudinally extending, angularly spaced apart grooves 45 formed therein. These are weakening grooves, the purpose of which will be described below.

Nut washer 16 is generally planar with parallel faces, having a central aperture somewhat larger than the bolt shank, except that it is formed with an axially projecting annular rib 46 on the outer face thereof, said rib being concentric with the washer axis, and its configuration is substantially the same as that of groove 38 of the nut. That is, its outer wall 48 is spherically curved to the same radius of curvature as groove 40, and its inner wall 50 is cylindrical. The projection of rib 46 is preferably somewhat greater than the depth of nut groove 38. The diameter of inner rib wall 50 is somewhat greater than that of the inner cylindrical wall of groove 38.

The bolt, nut and washer combination is applied in use as best shown in FIGS. 1 and 2, washer 14 being applied, concave side out, between bolt head 22 and the work pieces, and washer 16 being applied, ribbed side out, between nut 12 and the work pieces. FIG. 1 shows the joint assembled and the nut drawn up to just contact the nut washer, but before the nut is drawn tight. At this time, the convex outer wall of rib 46 is partially engaged with the concave outer wall 40 of groove 38, but the rib is not fully engaged in the groove due to the somewhat larger diameter of the rib as compared to that of the groove. The nut is then drawn still tighter on the bolt, upon which the relative axial movement of the nut and nut washer causes rib 46 to expand the inner portion 30 of the nut in diameter, by forcing tongues 34 thereof radially outwardly. This action may if desired be continued until rib 46 completely fills groove 38, as shown in FIG. 2, or, if said groove is deeper than the projection of the rib, until the inner end 36 of the nut abuts directly against the planar surface of washer 16. This relieves contact between the bolt threads and the threads of the inner portion 30 of the nut, as shown to an exaggerated scale in FIG. 2.

Referring first to the head end of the bolt, it will be understood that the juncture between the bolt shank and bolt head is one of the two points of strongest stress concentration in the usual bolt connector, the other being at the base of the threads at the inner end of the nut. At the head end, the head-shank juncture is usually a right angle. In the present structure, convex surface 26 of the bolt head merges with the shank at an obtuse angle, and this tends to relieve and reduce the concentration of stresses in this plane. Also, rounding this juncture to a short radius, to form a fillet, further reduces the stress concentration. In the usual bolt connection, furthermore, if the hole 6–8 of the work pieces is not drilled precisely at right angles to the distal faces of said work pieces, so that the bolt shank cannot move to a position accurately normal to said faces, or if the inner face of the bolt is not precisely normal to the shank axis, as can occur due to normal manufacturing variations, then said inner bolt head face is not exactly parallel to the adjoining work piece face, but at a slight angle thereto. Then, when the bolt is drawn tight, the abutment of said bolt head face with the work piece, or with the usual flat washer, tends to move said bolt head face forcibly against the work piece, or the flat washer, thus applying a sometimes severe transverse bending stress to the bolt at the head-shank juncture. This can further promote breakage of the bolt at this point, particularly in services wherein it is subjected to continuous or severe vibration. In the present device, however, the "ball" surface 26 of the bolt head rests for free universal pivoting in the "socket" formation 44 of washer 14, so that the bolt shank is accurately axially loaded despite angling of said shank relative to the work faces, and despite inaccuracies of the bolt head. This virtually eliminates bending stresses at the head-shank juncture. If the bolt is tightened in the usual way by holding head 22 stationary and turning nut 12, there will be virtually no slippage between the head and washer 14. However, if the bolt is tightened by holding nut 12 stationary and turning head 22, constant slippage between head surface 26 and washer surface 44 is necessary in order to maintain accurate axial loading of the shank. Free slippage of these surfaces is difficult to maintain under the heavy loading thereof as the bolt approaches full tension. For this reason, it is desirable that these surfaces be made as smooth and polished as may be practical. Lubrication thereof is also useful for this purpose.

Referring next to the nut end of the connector, it will be seen that the convex "ball" surface 48 of rib 46 of washer 16 cooperates with the concave "socket" surface 40 of groove 38 of the nut, in the same manner as described above in connection with surfaces 26 and 44 at the head end of the bolt, to compensate for angularity of the bolt shank to the work surfaces, and for manufacturing inaccuracies of the nut itself, such as the fact that the thread axis thereof may not be precisely normal to the inner face 36 of the nut. This maintains axial loading of the bolt despite said inaccuracies, and hence eliminates bending stresses in the shank at the base of its threads at the inner face of the nut, which is perhaps the commonest point of bolt failure. For the same reasons as discussed in connection with the ball and socket surfaces 26 and 44 at the head, it is desirable that surfaces 48 and 40 be freely slidable over each other even under heavy load, and for this reason they also may be polished and lubricated as described. If they fail to slip during final tightening of the nut, so that the washer 16 turns with the nut, some bending stress may be applied to the bolt shank if the shank is not normal to the work or if the nut is inaccurate as discussed. If some failure of ball-and-socket slippage does occur, and it is difficult to prevent it under the heavy loads occuring when tightening is almost complete, and if as a result some slight residual bending stress is applied to the shank, the effect of this stress is alleviated and minimized by the expansion of tongues 34 of the inner slotted portion 30 of the nut. In this manner, any bending strain in the shank is distributed all the way from the work face to the solid outer end portion 28 of the nut, not merely from the work face to the inner face 36 of the nut. This distribution of the strain over a longer length of the shank reduces its intensity in any one transverse plane of said shank, and hence reduces any possibility of failure resulting therefrom.

Actually, for the purpose of assuring freedom of movement of the ball-and-socket connection between rib 46 and groove 38, it is further desirable that the nut not be tightened to the full extent shown in FIG. 2, wherein said rib completely fills said groove. In this event, the pivotal freedom of the joint is arrested, and any bending stresses of the shank originally alleviated by the pivotal movement would tend to be re-introduced. For this reason, it is desirable that the nut actually be tightened only to a position intermediate those shown in FIGS. 1 and 2, that is, to a position in which nut tongues 34 are somewhat expanded, but in which rib 46 does not completely fill groove 38. This can be done if the parts are designed to produce the desired design tension of the bolt at this point, and if the nut is carefully applied with a specific torque by means of a torque-regulating wrench. Nevertheless the nut may be overtightened by a careless workman, and for this reason it is desirable that a limit to the tightening be provided to avoid over-expansion and possible breakage of the nut. In the present structure, this limit occurs when rib 46 completely fills groove 38, as shown, or when inner face 36 of the nut abuts the outer planar face of washer 16. Any bending stress tending to be re-introduced into the bolt shank by operation of these limits is alleviated and minimized by the expansion of nut tongues 34, as already described. Externally, the slotted inner end portion 30 of the nut is smooth and cylindrical, in order that a careless workman cannot apply a wrench thereto, as this would inhibit both the expansion of the nut and the pivoting of the ball-and-socket formations.

The grooves 45 of head washer 14 so weaken said washer that, if properly designed, said washer will be the first element of the combination to fail, particularly in vibratory services. This is a safety provision, in that while said washer is external to the connection and its breakage provides a clear indication to an inspector that the bolt assembly should be replaced, nevertheless its breakage does not represent complete and total failure of the combination, which hence can serve its basic function to some degree until replacement can be made.

While I have shown and described a specific embodiment of my invention, it will be readily apparent that many minor changes of structure and operation could be made within the scope of the invention. For example, it has been found that slots 32 of the nut may not be necessary so long as the nut is sufficiently yieldable to permit expansion thereof by washer 16 in almost any degree, however slight, since while said expansion is exaggerated in the drawing for purposes of clarity and illustration, the actual degree of expansion required for the purposes stated is very slight. Also, the degree of pivotal movement between the head and nut and their respective washers is very slight, and for this reason precise spherical formation of the "balls" and "sockets," while desirable, is not essential. It is necessary only that the formations be such as to permit at least very slight angling between the bolt axis and the axes of the respective washers. Even conical formations, particularly if their generating angles are slightly different, have been found to perform satisfactorily. Also, while two washers as shown are desirable, having ball-and-socket relationships respectively with the bolt head and nut, the use of only either one of these washers alone has been found to reduce materially the chances of bolt failure. It is considered that all of these changes or alternatives, as well as others, could be made without departing from the spirit of the invention.

What I claim as new and desire to protect by Letters Patent is:

1. A bolt, nut and washer combination comprising:
 (a) a bolt having a shank threaded at one end and having an enlarged head at its opposite end,
 (b) an internally threaded nut adapted to be threadably engaged on the threaded portion of said bolt, and
 (c) an annular washer adapted to encircle said bolt shank immediately adjacent said nut, whereby nominally to be coaxial with said nut, said nut having a face convergent toward the end of said nut remote from said washer and said washer having a cooperating projecting face confronting said nut face, the confronting faces of said nut and said washer being provided with interengaging formations whereby the axis of said washer may be pivotally misaligned, in any direction, with the axis of said nut, and operable, by movement of said nut and washer axially toward each other, to expand the inner end portion of said nut radially outwardly, said nut including weakening means to permit said radial expansion only from the inner end of said nut to a point intermediate the ends of the threads thereof.

2. A combination as recited in claim 1 wherein the inner end portion of said nut is radially slotted at angular intervals to produce a series of tongues extending toward the inner end of said nut, whereby to facilitate radial expansion of said nut by said interengaging formations, said slots extending from the inner end of said nut to a point intermediate the ends of the threaded portion of said nut.

3. A combination as recited in claim 1 wherein said interengaging formations comprise spherical ball and socket formations formed respectively on said washer and said nut, said surfaces each being concentric with, and having its center of curvature lying in, the axis of the number of which it forms a part, said surfaces being divergent in a direction away from the inner end of said nut, whereupon said washer will expand the inner end portion of said nut radially outwardly as said nut is moved axially closer to said washer.

4. A combination as recited in claim 3 wherein the spherical socket surface of said nut is spaced radially outwardly from the bore of said nut, and wherein the inner end portion of said nut is radially slotted at angular intervals to divide said nut portion into a series of tongues with their free ends defining the inner end of said nut, whereby to facilitate expansion of said nut.

References Cited

UNITED STATES PATENTS

| 1,155,664 | 10/1915 | Lambert | 285—2 |
| 1,967,063 | 7/1934 | Pielstick. | |
| 3,020,946 | 2/1962 | Mills | 85—50 |
| 3,087,371 | 4/1963 | Orner | 85—50 |
| 3,212,393 | 10/1965 | Waeltz | 85—50 |
| 3,280,690 | 10/1966 | Rubin | 85—50 |

FOREIGN PATENTS

| 1,193,489 | 4/1959 | France. |
| 685,470 | 12/1939 | Germany. |

EDWARD C. ALLEN, Primary Examiner

U.S. Cl. X.R.

85—9, 32, 50